United States Patent
Lin et al.

(10) Patent No.: US 10,873,765 B2
(45) Date of Patent: Dec. 22, 2020

(54) TECHNIQUES FOR HIGH EFFICIENCY ENTROPY CODING OF VIDEO DATA

(71) Applicant: Apple Inc., Cupertino, CA (US)

(72) Inventors: Ken Kengkuan Lin, Redwood City, CA (US); Mitchell H. Oslick, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/939,747

(22) Filed: Mar. 29, 2018

(65) Prior Publication Data

US 2019/0306535 A1    Oct. 3, 2019

(51) Int. Cl.
| | |
|---|---|
| *H04N 19/13* | (2014.01) |
| *H04N 19/70* | (2014.01) |
| *H04N 19/91* | (2014.01) |
| *H04N 19/176* | (2014.01) |
| *H04N 19/44* | (2014.01) |
| *H04N 19/625* | (2014.01) |
| *H04N 19/169* | (2014.01) |
| *H04N 19/93* | (2014.01) |
| *H04N 19/129* | (2014.01) |
| *H04N 19/18* | (2014.01) |

(52) U.S. Cl.
CPC .......... *H04N 19/91* (2014.11); *H04N 19/129* (2014.11); *H04N 19/176* (2014.11); *H04N 19/18* (2014.11); *H04N 19/1883* (2014.11); *H04N 19/44* (2014.11); *H04N 19/625* (2014.11); *H04N 19/70* (2014.11); *H04N 19/93* (2014.11)

(58) Field of Classification Search
CPC ...... H04N 19/91; H04N 19/176; H04N 19/44; H04N 19/625; H04N 19/70
See application file for complete search history.

(56) References Cited

U.S. PATENT DOCUMENTS

| | | | |
|---|---|---|---|
| 4,969,040 A | 11/1990 | Gharavi | |
| 5,276,525 A * | 1/1994 | Gharavi | H04N 19/63 348/398.1 |
| 5,298,992 A | 3/1994 | Pietras et al. | |
| 8,582,656 B2 | 11/2013 | Lin et al. | |
| 10,715,805 B2 * | 7/2020 | Song | H04N 19/119 |
| 2008/0013633 A1 | 1/2008 | Ye et al. | |
| 2008/0253463 A1 * | 10/2008 | Lin | H04N 19/129 375/240.25 |

(Continued)

OTHER PUBLICATIONS

European Patent Application No. 19165762.6; Extended Search Report; dated Sep. 3, 2019; 8 pages.

*Primary Examiner* — Tsion B Owens
(74) *Attorney, Agent, or Firm* — BakerHostetler (57) ABSTRACT

Entropy coding/decoding techniques are disclosed in which data is coded alternately as a series of nonzero values and zero values until the transmitted data is consumed. Nonzero values may be coded first with transmission of data identifying a number of consecutive nonzero values that appear in scan order followed by transmission of the nonzero values themselves. Thereafter, if other data remains to be transmitted, data may be transmitted identifying a number of consecutive zero values that appear next in scan order followed by transmission of a next nonzero value encountered in scan order. By transmitting the nonzero values as a group, it is expected that the proposed entropy-coding process will achieve higher efficiency than competitive techniques.

27 Claims, 8 Drawing Sheets

(56) References Cited

U.S. PATENT DOCUMENTS

| | | |
|---|---|---|
| 2012/0020408 A1 | 1/2012 | Chen et al. |
| 2012/0140822 A1* | 6/2012 | Wang .................... H04N 19/129 |
| | | 375/240.12 |
| 2018/0220159 A1* | 8/2018 | Won ..................... H04N 19/182 |

* cited by examiner

TECHNIQUES FOR HIGH EFFICIENCY ENTROPY CODING OF VIDEO DATA

BACKGROUND

Various encoding schemes are known for compressing video. Many such schemes are block transform based (e.g., DCT-based), and operate by organizing each frame of the video into two-dimensional blocks. DCT coefficients for each block are then placed in a one-dimensional array in a defined pattern, typically in a zig-zag order through the block. That is, each block is processed independently of each other block, and the DCT coefficients are grouped block-by-block. The coefficients are then encoded using standard run-length coding according to a predetermined scan direction; each encoded block is terminated by an end-of-block codeword. When decoding the video stream, the decoder uses the end-of-block codewords to identify when a new block is being decoded.

Other techniques entropy code video data by combining data from multiple coded blocks according to scan patterns that traverse like-kind coefficient positions of the multiple blocks consecutively, then advance to a new coefficient position and traverse the like-kind coefficient positions of the multiple blocks consecutively.

Conventional entropy coding techniques typically transmit data according to an iterative pattern that, first, identifies a number of zero-valued coefficients that are encountered in the scan direction (commonly called a "run"), followed by data identifying a value of a first nonzero coefficient thereafter. If several nonzero coefficients are encountered consecutively, the conventional entropy coding techniques require, first, a codeword to be transmitted indicating that no zero-valued coefficients exist before the first nonzero coefficient, followed by the value of the nonzero coefficient itself.

DETAILED DESCRIPTION

Aspects of the present disclosure provide entropy coding techniques in which data is coded alternately as a series of nonzero values and zero values until the transmitted data is consumed. Nonzero values may be coded first with transmission of data identifying a number of consecutive nonzero values that appear in scan order followed by transmission of the nonzero values themselves. Thereafter, if other data remains to be transmitted, data may be transmitted identifying a number of consecutive zero values that appear next in scan order followed by transmission of a next nonzero value encountered in scan order. By identifying counts of the number of values being transmitted for each sequence of nonzero values, the proposed techniques avoid inefficiencies of other techniques, which require transmission of data identifying the number of zero values that appear between consecutive nonzero values, even if there are none.

The inventors have determined that it is possible to have long sequences of nonzero coefficient values, which can lead to inefficiencies in the conventional entropy coding techniques described above. Under the entropy coding techniques proposed herein, when a sequence of consecutive nonzero values are encountered in a scan direction, an entropy coder may transmit a count value representing the number of nonzero values that are encountered, followed by the values themselves. This approach is expected to increase coding efficiency because it avoids transmission of codewords indicating the absence of nonzero coefficient values.

Figure 1:
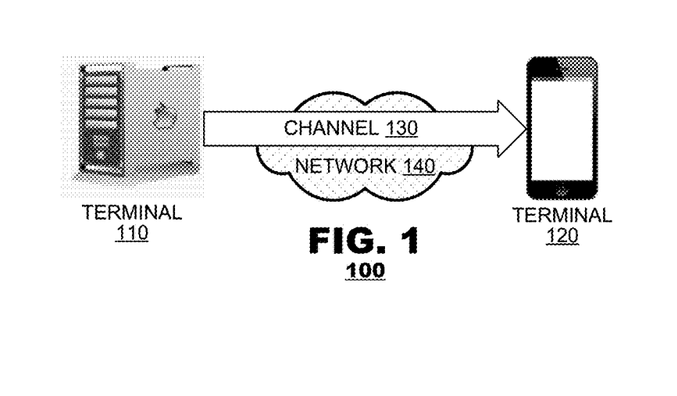
FIG. 1 illustrates a video exchange system according to an aspect of the present disclosure.

FIG. 1 illustrates a video exchange system 100 according to an aspect of the present disclosure. The system 100 may include a pair of terminals 110, 120 interconnected by a channel 130. The terminals 110, 120 may exchange coded video between them. For example, a first terminal 110 may generate a source video, code the source video by bandwidth compression and transmit the coded video to a second terminal 120. The second terminal 120 may decompress the coded video by inverting coding operations applied by the first terminal 110, which yields decoded video data. Thereafter, the second terminal 120 may consume the decoded video, for example, by displaying it or storing it locally at the terminal 120.

Exchange of coded video may occur in a variety of applications. For example, a first terminal 110 may code video for on demand delivery to other terminals 120 according to a store-and-forward distribution model. In such applications, a first terminal 110 may code the video and store it locally until it is requested by another terminal 120. In another application, a first terminal 110 may capture video for real-time delivery to terminal(s) 120 in a unicast or broadcast distribution model. Alternatively, terminals 110, 120 may be engaged in bidirectional exchange of video as may occur, for example, in a video conference; for bidirectional video exchange, each terminal 110, 120 would code video and deliver coded video to the other terminal 110, 120 where it would be decoded. Thus, the principles of the present disclosure find application in a variety of use cases where exchange of video data is desired.

Although the terminals 110, 120 are illustrated as servers and smartphones, respectively, the principles of the present disclosure find application with a variety of computing equipment. The principles of the present disclosure find application with various types of computers (desktop, laptop, and tablet computers), computer servers, media players, dedicated video conferencing equipment and/or dedicated video encoding equipment.

The channel 130 represents any of a number of different communication fabric for delivery of coded video data between the terminals 110, 120. In the example illustrated in FIG. 1, the channel 130 may be formed by a communication network 140 for example by wireline and/or wireless communication networks. The communication network 140 may exchange data in circuit-switched or packet-switched channels. Representative networks include telecommunications networks, local area networks, wide area networks, and/or the Internet. In other distribution models, the channel 130 can be formed by storage media, for example, an optical, electrical or magnetic computer-readable storage medium. Exemplary storage media include hard drive memory, flash memory, floppy disk memory, optically-encoded memory (e.g., a compact disk, DVD-ROM, DVD.+-.R, CD-ROM, CD.+-.R, holographic disk, high-definition storage media), thermomechanical memory, or any other type of computer-readable (machine-readable) storage medium. For the purposes of the present discussion, the architecture and topology of the channel 130 are immaterial to the operation of the present disclosure unless otherwise noted.

Figure 2:
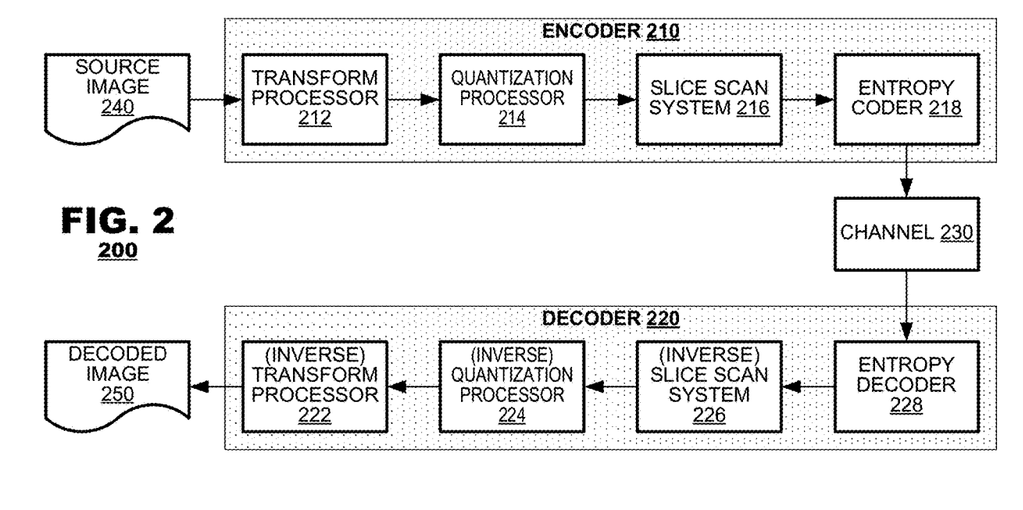
FIG. 2 is a simplified block diagram of system for encoding and decoding video according to an aspect of the present disclosure.

FIG. 2 is a simplified block diagram of system 200 for encoding and decoding video according to an aspect of the present disclosure. The system 200 may include an encoder 210 and a decoder 220 provided in communication with each other by a channel 230. As described, the encoder 210 may code a source image 240 and deliver a coded image to the channel 230. The decoder 220 may receive the coded image from the channel, decode it, and generate a decoded image 250 therefrom.

FIG. 2 illustrates components of an encoder 210 that are involved with entropy coding proposed by the present disclosure. They include a transform processor 212, a quantization processor 214, a slice scan system 216, and an entropy coder 218. The transform processor 212 may apply a selected transform to image data, such as a discrete cosine transform (commonly, "DCT"), which converts the image data from a pixel domain to a transform domain. The quantization processor 214 may apply quantization to the transform coefficients output by the transform processor 214. Typically, each transform coefficient is divided by a respective quantization parameter, which can reduce the amount of data required to represent the transform coefficients and, in some cases, reduce the transform coefficients to zero. The slice scan system 216 may arrange the quantized coefficients into a predetermined order for processing by the entropy coder 218. The entropy coder 218 may code the ordered coefficients as discussed herein. Coded video data output by the entropy coder 218 may be provided to the channel 230.

FIG. 2 also illustrates components of a decoder 220 that are involved with entropy coding proposed by the present disclosure. They include an inverse transform processor 222, an inverse quantization processor 224, an inverse slice scan system 226 and an entropy decoder 228. As their names imply, these components 222-228 may invert coding operations performed by their counterparts 212-218 in the encoder 210. Specifically, the entropy decoder 228 may decode coded video data as discussed herein. The entropy decoder 228 may output quantized coefficients, which are reorganized by the inverse slice scan system 226. The inverse quantization processor 224 may perform inverse quantization by multiplying quantized coefficients by the same quantization parameters that were applied by the quantization processor 214 of the encoder 210. In practice, quantization and inverse quantization is a lossy process; thus, the transform coefficients output by the inverse quantization processor 224 at the decoder 220 likely will resemble but not match the transform coefficients that were input to the quantization processor 214 of the encoder 210. The inverse transform processor 222 may invert transform processes applied by the transform processor 212 of the encoder 210. The inverse transform processor 222 may output image data in the pixel domain. A decoded image 250 may be generated from the pixel data output by the decoder 220.

As discussed, FIG. 2 is a simplified diagram of the components of an encoder 210 and a decoder 220. In practice, encoders and decoder 210, 220 often include other components for processing video data. For example, many modern video coding systems employ prediction to exploit spatial and/or temporal redundancy in video data. Rather than input source image data 240 directly to a transform processor 212, source image data 240 may be coded differentially with respect to prediction data. In this case, a transform processor 212 may receive input data representing pixel-wise differences between the source image 240 and prediction data (not shown). Similarly, prediction may be used at the decoder 220. Pixel data output by the inverse transform processor 222 may be added to prediction data (not shown) to generate a decoded image 250. Such operations are not illustrated in the block diagram of FIG. 2, nor are components that typically are provided to process other types of data such as audio data.

Figure 3A:
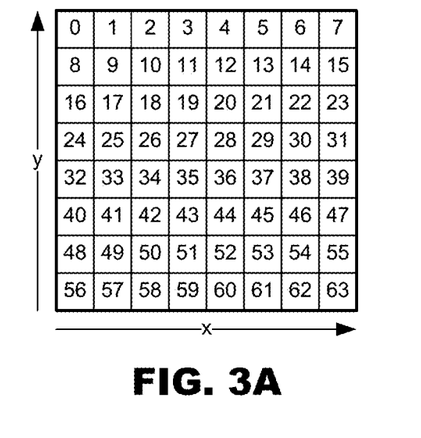
FIGS. 3A, 3B, 3C, 4A, 4B and 5 each illustrate exemplary operations of array scan processes.
Figure 3B:
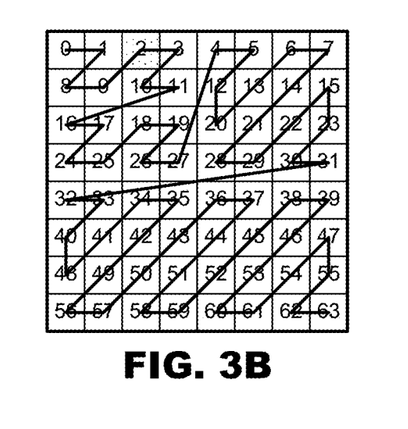

As discussed, the slice scan system 216 represents a process that reorganizes quantized coefficient data for processing by an entropy coder 218. FIG. 3 illustrates an example of one such reorganization process. FIG. 3A illustrates an exemplary block of quantized coefficient data organized as x columns and y rows. In this example, x and y both are 8, which yields a block having 64 positions for quantized coefficient data. FIG. 3B illustrates an exemplary scan operation that scans coefficient positions in the following order: 0, 1, 8, 9, 2, 3, 10, 11, 16, 17, 24, 25, 18, 19, 26, 27, 4, 5, 12, 20, 13, 6, 7, 14, 21, 28, 29, 22, 15, 23, 30, 31, 32, 33, 40, 48, 41, 34, 35, 42, 49, 56, 57, 50, 43, 36, 37, 44, 51, 58, 59, 52, 45, 38, 39, 46, 53, 60, 61, 54, 47, 55, 62, 63. The slice scan system 216 may organize the two-dimensional array illustrated in FIG. 3A into a serial data stream represented by the scan order shown in FIG. 3B. Having been reorganized in such a manner, the coefficient data may be processed by the entropy coding system.

The operations illustrated in FIGS. 3A and 3B find application with many kinds of video coding systems. Conventionally, transform processors (FIG. 2) are applied to image data that has been parsed into pixel blocks of predetermined size. Thus, each pixel block represents a two-dimensional region of an input image and the transform processor 212 transforms pixel data (or pixel residuals) into a transform domain. The slice scan system 216 (FIG. 2) may reorganize quantized coefficients of individual blocks into a serial data steam as illustrated in FIGS. 3A and 3B. In this example, the slice scan process generates a data stream having x·y coefficients.

Figure 4A:
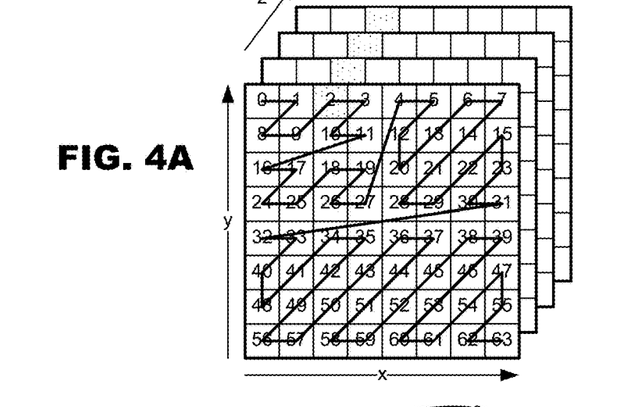
Figure 4B:
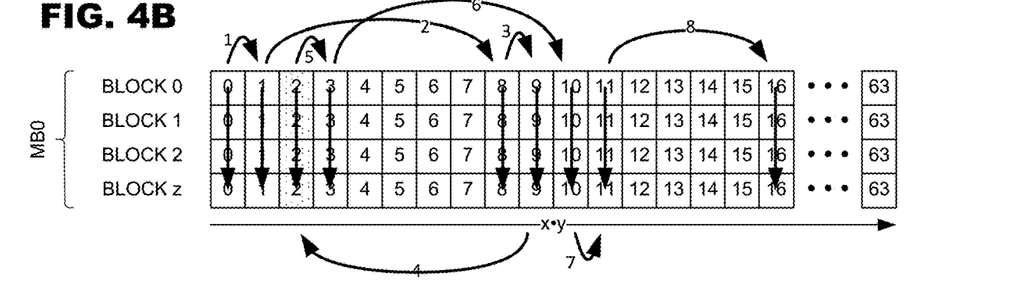

The principles of the present disclosure find application with larger arrays of image data than mere pixel blocks. For example, as shown in FIGS. 4A and 4B, image data from multiple blocks may be merged and formed into a serial data stream for processing by an entropy coder 218 (FIG. 2). In the example of FIG. 4A, a plurality of pixel blocks are shown as arranged into a three-dimensional array in which like-kind coefficients are aligned (e.g., all coefficients at positions 0, 1, 2, . . . , 63 are aligned with each other). In FIG. 4B, the same data is illustrated as a two-dimensional structure in which data of each block occupy a single row and columns maintain alignment of like-kind coefficient positions. In this example, the slice scan process generates a data stream having x·y·z coefficients.

In an aspect, a slice scan system 216 may traverse coefficients of multiple blocks in a single coding operation. The scan starts at a first coefficient position (say, position 0) and scans across all blocks (say, blocks 0-3 of FIG. 4B) at that position. The scan advances to a next coefficient position (say, position 1) and scans across all blocks at that position. The scan incrementally advances to successor positions (say, positions 8, 9, 2, and 3 in order) and, at each scan position, the slice scan system may scan across all blocks in each of the positions before advancing to the next successor position.

During operation, because the array stores quantized transform coefficients, it is likely that the values at many of the coefficient positions will be zero. If there is significant redundancy in image content among the blocks in the array of FIG. 4B, then the zero-valued coefficients are likely to be clustered among many columns of the array. Thus, the slice scan process coupled with run-length encoding of zero-valued coefficients may yield improved coding efficiency over a scan system that operates on blocks individually (FIGS. 3A, 3B) because the slice scan system will yield much longer runs of zero-valued coefficients.

As a specific example, the blocks illustrated in FIG. 4B may be the luma component blocks of a macroblock. The transform coefficients for each block at each component position 0-63 may be stored in a transform coefficient array in the order shown in FIG. 4B. An entropy encoder 218 (FIG. 2) then can encode the coefficients by processing coefficients at the same position in each block together. That is, the coefficients in the first column (the 0-position coefficients) may be processed first, followed by the coefficients in the second column (position 1), and so on. Generally, low-frequency coefficients may be processed first.

Figure 3C:
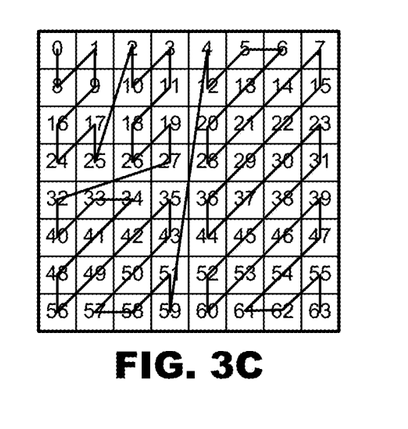

The principles of the present disclosure extend to other scan directions. Another scan protocol is illustrated in FIG. 3C.

The principles of FIGS. 4A and 4B find ready application in coding systems that parse image data first into macroblocks (a 16 pixel by 16 pixel array) and then partition the macroblocks on a quadrature basis into subordinate blocks (often 8×8 each). Thus, each macroblock typically includes four subordinate blocks. The subordinate blocks may be organized and scanned as illustrated in FIGS. 4A and 4B.

Figure 5:
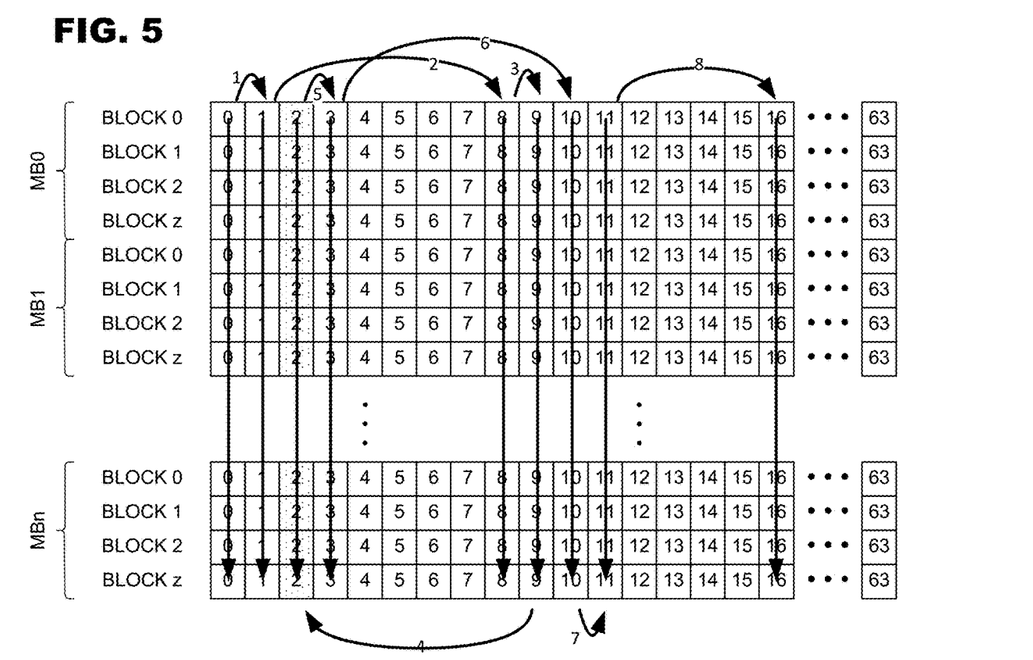

The principles of the present discussion may be extended to larger groups of blocks. For example, as illustrated in FIG. 5, data from n macroblocks are shown as reorganized into a common data stream for processing by an entropy coder. In this example, the slice scan process may generate an array of $x \cdot y \cdot z \cdot n$ coefficients.

Figure 6:
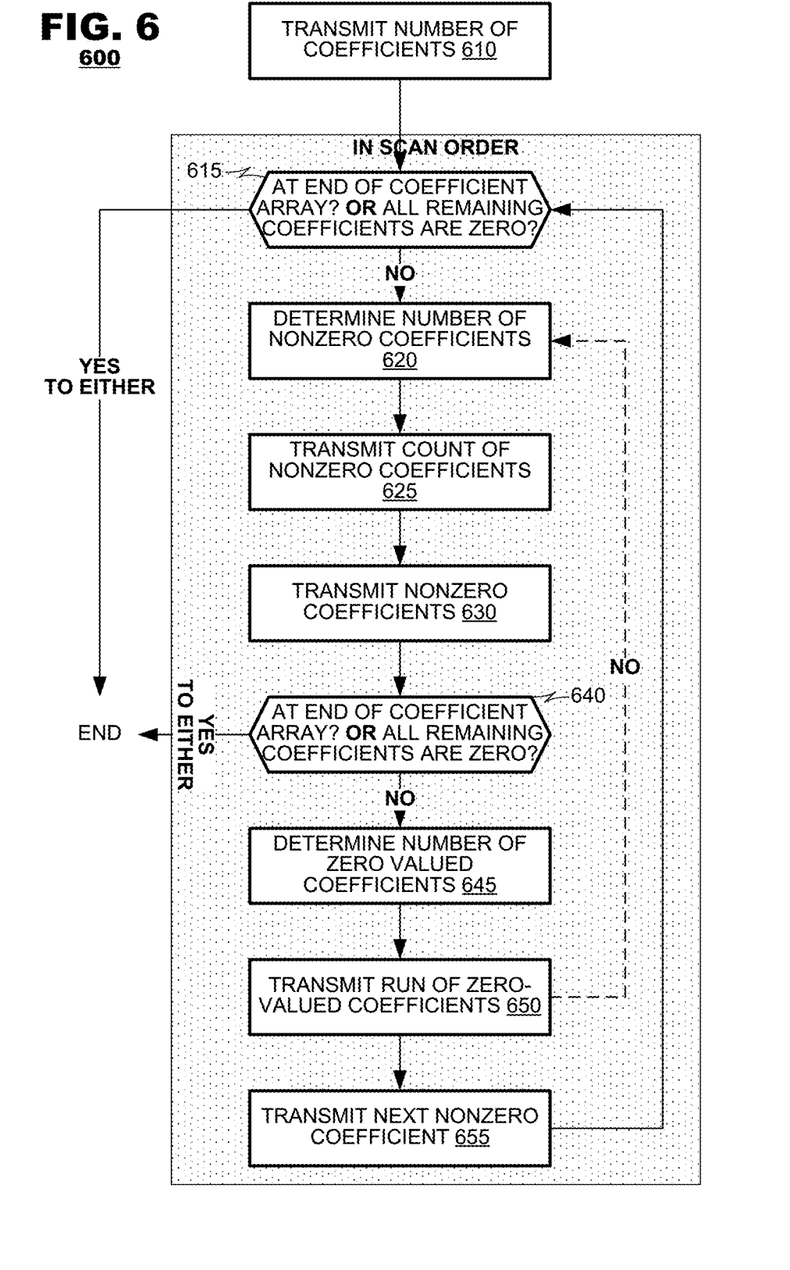
FIG. 6 illustrates an entropy coding method according to an aspect of the present disclosure.

FIG. 6 illustrates an entropy coding method 600 according to an aspect of the present disclosure. Entropy coders 218, 930 (FIGS. 2, 9) may operate according to the method 600 of FIG. 6. The method 600 may begin by transmitting data representing a number of coefficients being processed by a current instance of the method (box 610). The operation of box 610 may be omitted in applications where the number of coefficients is known to a decoder through other means, for example, by being predetermined by a governing coding protocol. The method 600 then may engage an iterative process to transmit levels and counts working across the data array in a scan order established by the slice scan process. An iteration may begin by determining whether the end of a coefficient array has been reached or, on a first iteration, whether all remaining coefficients of the array are zero (box 615). If either condition occurs, the method 600 may end. If not, however, then the method 600 may determine the number of nonzero coefficients that are next in scan order (box 620) and transmit data identifying the determined number of nonzero coefficients (box 625). The method 600 also may transmit data identifying each of the nonzero coefficients (box 630).

After transmission of the last nonzero coefficient determined at box 630, the method 600 may determine if the end of the coefficient array has been reached or if all remaining coefficients in the array are zero (box 640). If so, the method 600 may end. If not, then the method 600 may determine the number of zero-valued coefficients that are next in scan order (box 645) and it may transmit data identifying the number of zero-valued coefficients (box 650). The method 600 may transmit identifying the next nonzero coefficient in scan order (box 655) and return to the operation of box 615.

Operation of the method 600 is expected to provide coding efficiencies as compared to other entropy coding processes. As discussed, modern entropy coding processes iteratively transmit data identifying a number of zero-valued coefficients that occur consecutively, then transmit the value of a nonzero coefficient that follows. When multiple nonzero coefficients occur consecutively, the prior process requires transmission of codewords that identify that no zero-valued coefficients occurred between each nonzero coefficient and its next consecutive nonzero coefficient. These coding processes induce inefficiencies because it is common to have large numbers of nonzero coefficients appear consecutively in scan order, especially in applications where the data rate is high. It is expected that the operation of the method 600 illustrated in FIG. 6 will provide increased efficiencies by starting coding with identification of a count of consecutive nonzero coefficients that appear in scan order, followed by values of those nonzero coefficients (boxes 625-630). Transmission of codewords indicating the absence of zero-valued coefficients can be avoided.

The method 600 illustrated in FIG. 6 presents transmission of the count of nonzero valued coefficients and the nonzero coefficients' values (boxes 625-630) as occurring before transmission of the count of zero-valued coefficients and the next nonzero coefficient (boxes 650, 655). In practice, many scan orders are expected to start at positions at which nonzero coefficient values are more likely to be present than zero-valued coefficients. In other implementations (not shown in FIG. 6), transmission of a count of zero-valued coefficients and the next nonzero coefficient might precede transmission of the count of nonzero valued coefficients and the nonzero coefficient's values. Such implementations may be appropriate in applications where scan orders begin with coefficient positions that are more likely to have zero-valued coefficients than nonzero valued coefficients.

The principles of the present disclosure accommodate variations of the method 600 illustrated in FIG. 6. As discussed above, the method 600 need not transmit data identifying the number of coefficients (box 610) in applications where the number is determined by other means. For example, the number of coefficients may be predetermined by a governing coding protocol to a fixed number. Returning to FIG. 5, for example, in a case where n=8 and z=1, each scan operation may span eight 8×8 blocks of coefficient data for a total of 512 coefficients. The identification of the number of coefficients may be omitted if the number is fixed for every iteration of the method. In another embodiment, the number of coefficients may depend on other coding parameters provided in coded data, for example, sizes of coding units. In such applications, although the number of coefficients per scan operation may vary, the number may be derived from other coding parameters and, thus, an express transmission of the number of coefficients as shown in box 610 may be avoided.

In another aspect, a coder need not perform the operation of box 655 after transmission of a run of zero-valued coefficients in box 650. In such aspects (shown in phantom in FIG. 6), the method 600 may advance from box 650 to box 620, and the method 600 may determine the number of nonzero coefficients in the array that appear next in scan order.

Figure 7:
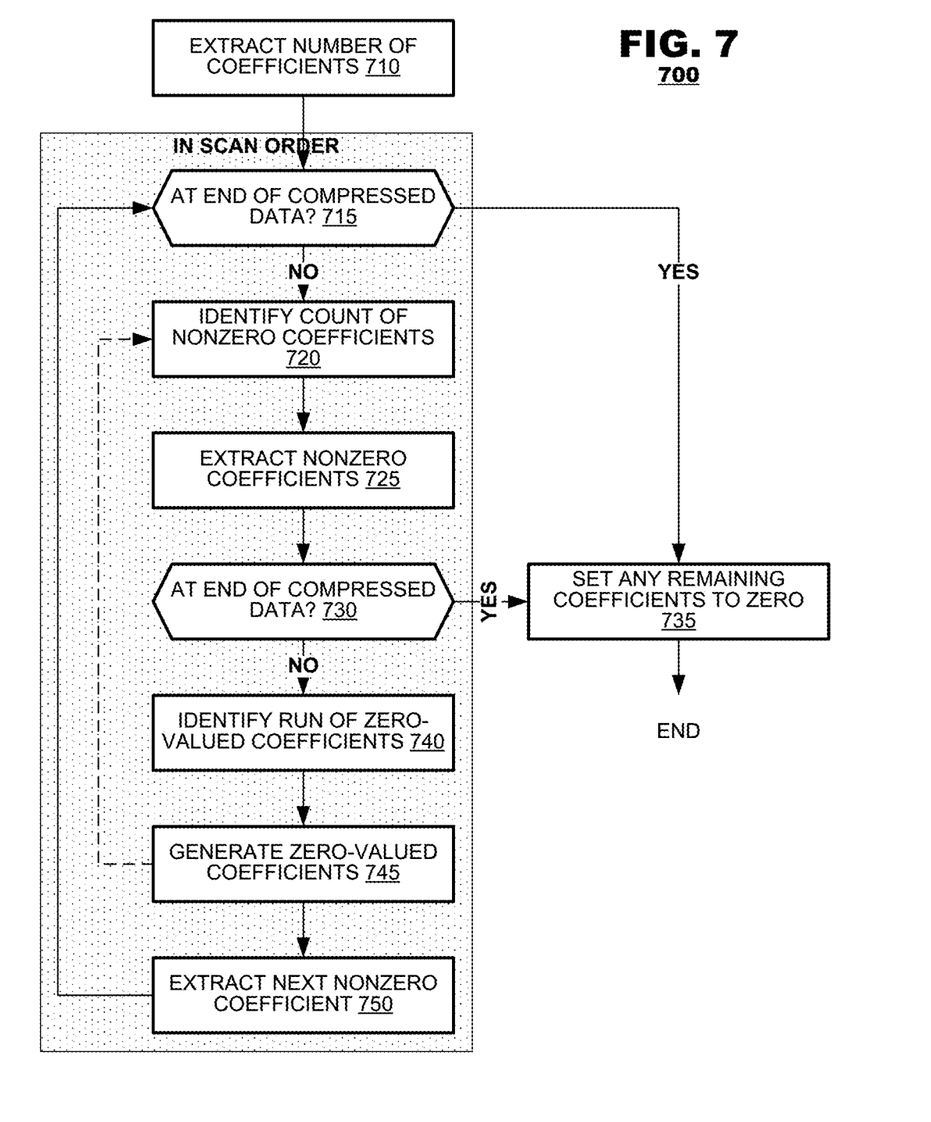
FIG. 7 illustrates an entropy decoding method according to an aspect of the present disclosures.

FIG. 7 illustrates an entropy decoding method 700 according to an aspect of the present disclosures. Entropy decoders 228, 1020 (FIGS. 2, 10) may operate according to the method 700 of FIG. 7. The method 700 may process a data stream of entropy-coded data that is received from a channel. As discussed, entropy decoding essentially inverts processes performed during entropy coding. The method 700 may begin by extracting from the channel data representing the number of coefficients in the entropy-coded data array and the data size (box 710). As discussed in connection with FIG. 6, data representing the number of coefficients need not be extracted from channel data if the value is known to the decoder through other means. The method 700 then may engage an iterative process to recover zero-valued and nonzero coefficients working across the data array in a scan order established by the slice scan process. An iteration may begin by determining whether the end of the compressed data has been reached (box 715). If so, the method 700 may end, as discussed below. If not, however, then the method 700 may identify, from the channel data, a number of nonzero coefficients that are next in scan order (box 720). The method 700 also may extract the nonzero coefficients from the channel data (box 725).

After extraction of the last nonzero coefficient, the method 700 may determine if the end of the compressed data has been reached (box 730). If so, the method 700 may set remaining coefficients, if any, to zero (box 735), and the method 700 may end. If not, then the method 700 may extract, from the channel data, data identifying the number of zero-valued coefficients that are next in scan order (box 740). The method may generate a number of zero-valued coefficients corresponding to the number identified by the channel data (box 745). The method 700 may extract, from the channel, data identifying the next nonzero coefficient in scan order (box 750) and it may return to the operation of box 715.

If, at boxes 715 or 730, the method 700 determines that the end of the compressed data has been reached, then the method 700 may set zero values for all remaining coefficient positions in the data array (box 735). Thereafter, the method 700 may end.

The method 700 illustrated in FIG. 7 presents identification of the count of nonzero valued coefficients and extraction of the nonzero coefficient's values (boxes 720-725) as occurring before identification of the run of zero-valued coefficients and extraction of the next nonzero coefficient (boxes 740, 750). As discussed, many scan orders are expected to start at positions at which nonzero coefficient values are more likely to be present than zero-valued coefficients. In other implementations (not shown in FIG. 7), however, identification of a count of zero-valued coefficients and extraction of a next nonzero coefficient might precede identification of the count of nonzero valued coefficients and extraction of the nonzero coefficient's values. Such implementations may be appropriate in applications where scan orders begin with coefficient positions that are more likely to have zero-valued coefficients than nonzero valued coefficients.

As with the method 600 of FIG. 6, the principles of the present disclosure accommodate variations of the method 700 illustrated in FIG. 7. As discussed above, the method 700 need not extract data identifying the number of coefficients (box 710) in applications where the number is determined by other means. Again, if the number of coefficients is set to a predetermined, fixed number or if the number of coefficients is to be derived from other coding parameters, the number of coefficients need not be extracted from channel data as shown in box 710.

Also, a decoder need not perform the operation of box 750 after generation of zero-valued coefficients from an identified run in box 745. In an alternative aspect (shown in phantom in FIG. 7), the method 700 may advance from box 745 to box 720. This aspect corresponds with the variant of the method 600 (shown in phantom in FIG. 6) as described.

Many coding protocols represent data as variable length codes that are integrated into a serially-coded data stream. Thus, the extraction operations performed by the method 700 in boxes 710, 720, 725, 740, and 750 each may define a context for the data elements that follow the extraction operations. That is, a variable length code that identifies the number of nonzero coefficients in box 720 may define context for extraction of a nonzero coefficient that is performed in box 725. Moreover, an extraction of a first nonzero coefficient in box 725 may define a context for identification and extraction of a next nonzero coefficient that also is performed in box 725.

Table 1, for example, provides a syntax that may be used for entropy coding and decoding according to the embodiments of FIGS. 6 and 7. In this example, entropy coding may be performed on a number of bits represented by the dataSize value.

TABLE 1

Exemplary Syntax for Entropy Coding

|  | Descriptor |
|---|---|
| scanned_coefficients(coefficients, numBlocks, dataSize) { | |
|   first_dc_coeff | vlc |
|   coefficients[0] = first_dc_coeff | |
|   previousDCCoeff = first_dc_coeff | |
|   n = 1 | |
|   while (n < numBlocks) { | |
|     dc_coeff_difference | vlc |
|     DCCoeff = previousDCCoeff + | |
|     dc_coeff_difference | |
|     coefficients[n++] = DCCoeff | |
|     previousDCCoeff = DCCoeff | |
|   } | |
|   while (!endOfData(dataSize)) { | |
|     level_count | vlc |
|     for (m = 0; m < level_count; m++) { | |
|       abs_level_minus_1 | vlc |
|       absLevel = abs_level_minus_1 + 1 | |
|       sign | u(1) |
|       coefficients[n++] = absLevel * (1 − 2 * sign) | |
|     } | |
|     if (!endOfData(dataSize)) { | |
|       zero_run_length_minus_1 | vlc |
|       zeroRunLength = | |
|       zero_run_length_minus_1 + 1 | |
|       for (m = 0; m < zeroRunLength; m++) | |
|         coefficients[n++] = 0 | |
|       abs_level_minus_1 | vlc |
|       absLevel = abs_level_minus_1 + 1 | |
|       sign | u(1) |
|       coefficients[n++] = absLevel * (1 − 2 * sign) | |
|     } | |
|   } | |
|   numCoefficients = numBlocks * 64 | |
|   while (n < numCoefficients) | |
|     coefficients[n++] = 0 | |
|   while (!byteAligned( )) | |
|     zero_bit /* Equal to 0 */ | f(1) |
| } | |

As illustrated, coding may begin by transmitting a first_dc_coeff value, which represents a value of a first DC coefficient in the data array being coded. Thereafter, coding may proceed in a loop represented by the number of blocks being coded (numBlocks), in which DC coefficients of remaining blocks are coded differentially with respect to a previously transmitted DC coefficient (dc_coeff_difference).

Coding may proceed in a loop in which data representing the number of nonzero coefficients (level_count) and the number of zero coefficients (zero_run_length_minus_1) are transmitted in alternating fashion. Specifically, when transmitting nonzero coefficients, a level_count parameter may identify the number of nonzero coefficients, and it may be followed by data representing values of the nonzero coefficients themselves (abs_level_minus_1 and sign). Thereafter, the zero_run_length_minus_1 may identify the number of zero coefficients, and it may be followed by data representing the value of the next nonzero coefficient (again, abs_level_minus_1 and sign).

Figure 8:
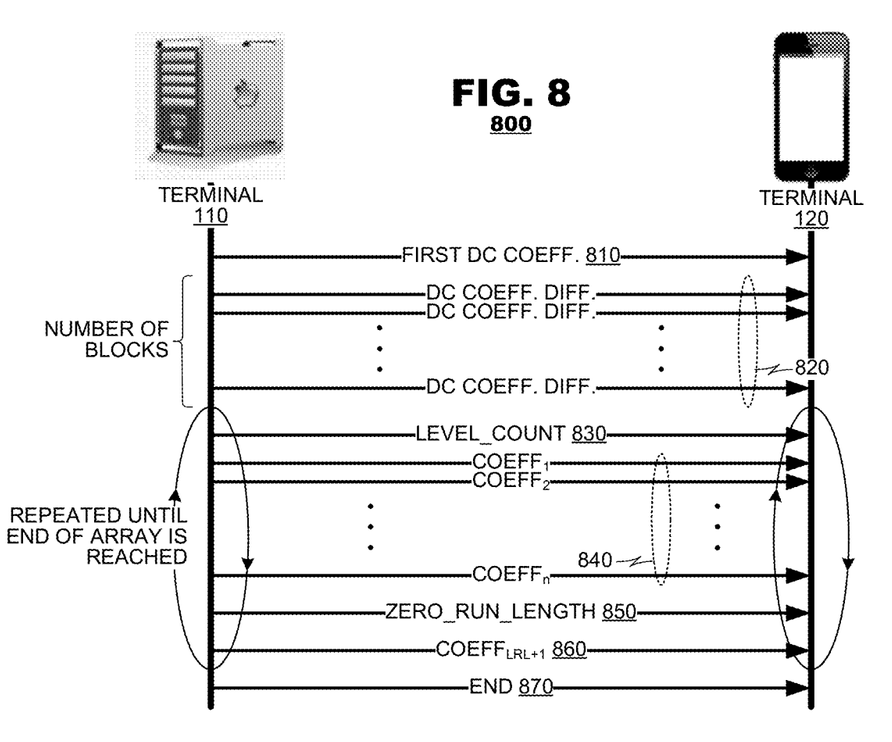
FIG. 8 illustrates communication flow between terminal devices that may occur according to the syntax defined in Table 1.

FIG. 8 illustrates communication flow between terminal devices 110, 120 that may occur according to the syntax defined in Table 1. As indicated, a transmitting terminal 110 may transmit a first DC coefficient (msg. 810) and, thereafter, transmit DC coefficients of other blocks in a differential manner (msgs. 820). The transmitting terminal 110 thereafter may transmit level run lengths and zero run lengths in an alternating manner until the end of the data array is reached. Specifically, the transmitting terminal 110 may transmit the level_count parameter (msg. 830), which identifies the number of nonzero coefficients that follow, and the nonzero coefficients themselves (msgs. 840). If the end of the data array has not been reached, the transmitting terminal 110 thereafter may transmit data identifying the zero_run_length (msg. 850) and the next nonzero coefficient that follows (msg. 860). If the end of the data array has not been reached, the transmitting terminal 110 may transmit a new level_count parameter and a new set of nonzero coefficients (msgs. 830, 840).

At some point, the transmitting terminal 110 will reach the end of the data array, at which point the transmitting terminal 110 may transmit data indicating the end of the array (msg. 870).

Figure 9:
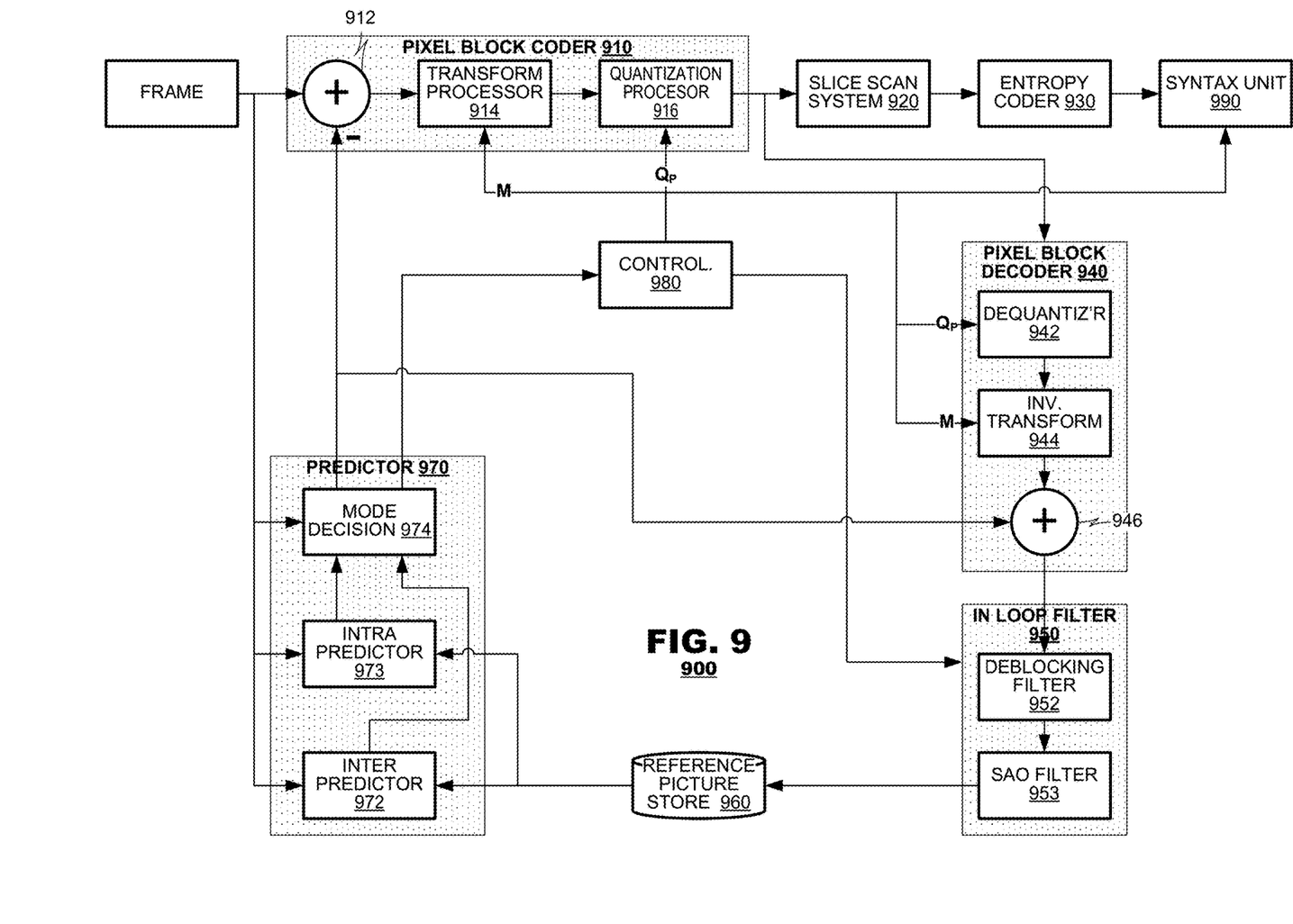
FIG. 9 is a functional block diagram of a coding system according to an aspect of the present disclosure.
Figure 10:
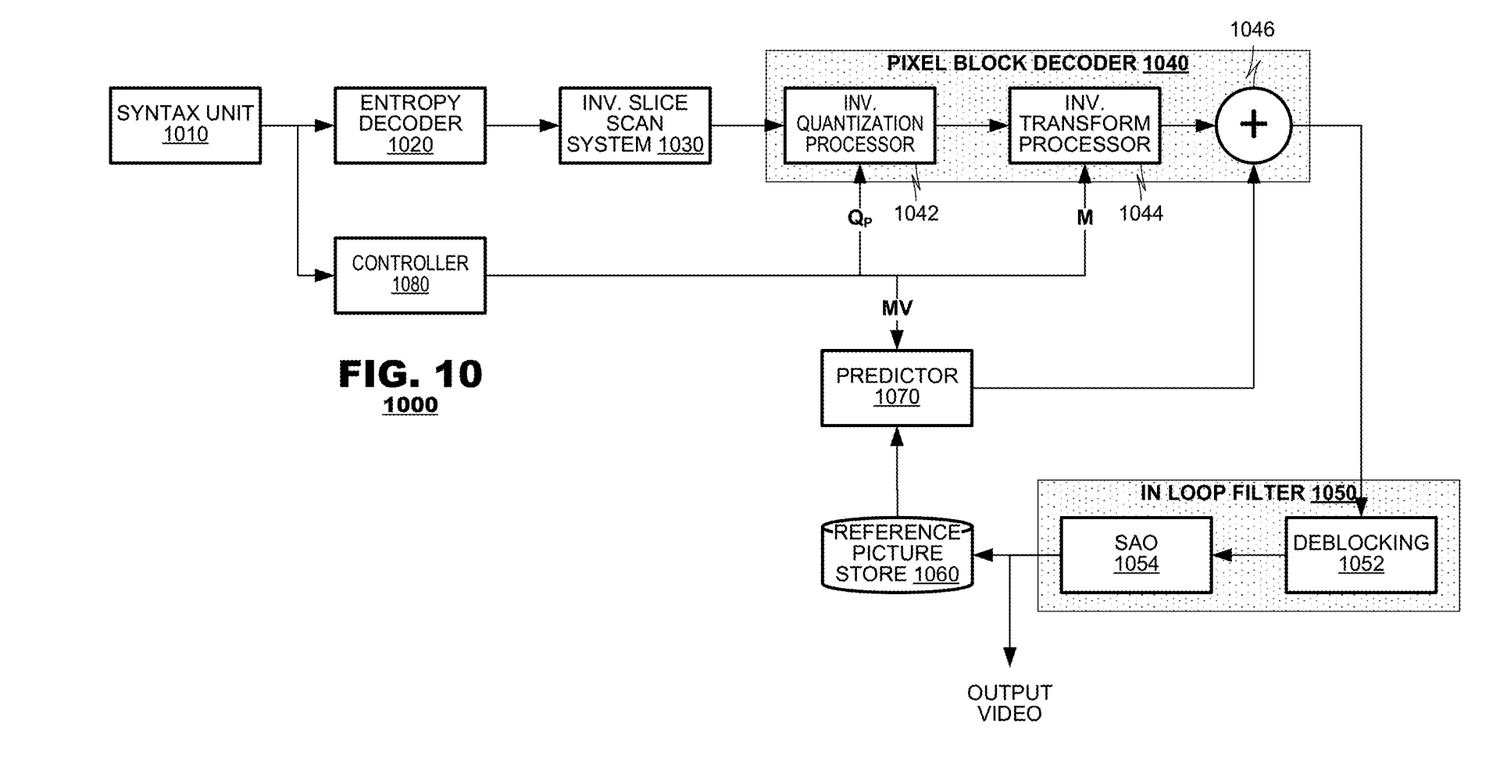
FIG. 10 is a functional block diagram of a decoding system according to an aspect of the present disclosure.

As discussed, the principles of the present disclosure find application in predictive coding systems, where input data is coded differentially with respect to prediction data generated for the input data. FIGS. 9 and 10 illustrate application of a slice scan system and an entropy coder to one such predictive coding system.

FIG. 9 is a functional block diagram of a coding system 900 according to an aspect of the present disclosure. The system 900 may include a pixel block coder 910, a slice scan system 920, an entropy coder 930, a pixel block decoder 940, an in-loop filter system 950, a reference picture store 960, a predictor 970, a controller 980, and a syntax unit 990. The pixel block coder and decoder 910, 940 and the predictor 970 may operate iteratively on individual pixel blocks of an input frame. Typically, the pixel blocks will be generated by parsing frames into smaller units for coding. The predictor 970 may predict data for use during coding of a newly-presented pixel block. The pixel block coder 910 may code the new pixel block differentially with respect to prediction data from the predictor 970. The slice scan system 920 may organize coded pixel block data into data arrays for coding by the entropy coder 930. The entropy coder 930 may apply entropy coding to the data arrays and output coded block data to the syntax unit 990, where it may be formatted for transmission to a channel (not shown).

The pixel block decoder 940 may decode the coded pixel block data from the pixel block coder 910 and decoded pixel block data therefrom. The in-loop filter 950 may perform various filtering operations on a decoded picture that is assembled from the decoded pixel blocks obtained by the pixel block decoder 940. The filtered picture may be stored in the reference picture store 960 where it may be used as a source of prediction of a later-received pixel block.

The pixel block coder 910 may include a subtractor 912, a transform processor 914, and a quantization processor 916. The pixel block coder 910 may accept pixel blocks of input data at the subtractor 912. The subtractor 912 also may receive predicted pixel blocks from the predictor 970 and generate an array of pixel residuals therefrom representing differences between the input pixel block and the predicted pixel block at each pixel location. The transform unit 914 may apply a transform to the pixel residuals output from the subtractor 912, to convert data from the pixel domain to a domain of transform coefficients.

The transform unit 914 may operate in a variety of transform modes as determined by the controller 980. For example, the transform unit 914 may apply a discrete cosine transform (DCT), a discrete sine transform (DST), a Walsh-Hadamard transform, a Haar transform, a Daubechies wavelet transform, or the like. In an aspect, the controller 980 may select a coding mode M to be applied by the transform unit 915, may configure the transform unit 915 accordingly and may signal the coding mode M in the coded video data, either expressly or impliedly.

The quantization processor 916 may perform quantization of transform coefficients output by the transform unit 914. The quantization processor 916 may operate according to a quantization parameter QP that is supplied by the controller 980. In an aspect, the quantization parameter QP may be applied to the transform coefficients as a multi-value quantization parameter, which may vary, for example, across different coefficient locations within a transform-domain pixel block. Thus, the quantization parameter QP may be provided as a quantization parameters array. In another aspect, however, the quantization parameter may be a uniform value that is applied to all transform coefficients. The quantization processor 916 may output quantized coefficients that have been rounded down to integer values. For some coefficients, the quantization may reduce the quantized coefficients to zero.

The slice scan system 920 may reorganize coefficients output from the pixel block coder 910 for processing by the entropy coding. In this regard, the slice scan system 920 may operate according to the principles of FIGS. 3-5, discussed hereinabove.

The entropy coder 930, as its name implies, may perform entropy coding of data output from the slice scan system 920. It may operate according to the principles described in FIGS. 6-8 and Table 1, described hereinabove.

The pixel block decoder 940 may invert coding operations of the pixel block coder 910. For example, the pixel block decoder 940 may include a dequantization processor 942, an inverse transform unit 944, and an adder 946. The pixel block decoder 940 may take its input data from an output of the quantization processor 916. The dequantization processor 942 may invert operations of the quantization processor 916 of the pixel block coder 910. The dequantization processor 942 may perform uniform or non-uniform de-quantization as specified by the quantization parameter QP. Similarly, the inverse transform unit 944 may invert operations of the transform unit 914. The dequantization processor 942 and the inverse transform unit 944 may use the same quantization parameters QP and transform mode M as their counterparts in the pixel block coder 910. Quantization operations likely will truncate data in various respects and, therefore, data recovered by the dequantization processor 942 likely will possess coding errors when compared to the data presented to the quantization processor 916 in the pixel block coder 910.

The adder 946 may invert operations performed by the subtractor 912. It may receive the same prediction pixel block from the predictor 970 that the subtractor 912 used in generating residual signals. The adder 946 may add the prediction pixel block to reconstructed residual values output by the inverse transform unit 944 and may output reconstructed pixel block data.

The in-loop filter 950 may perform various filtering operations on frame data that is constructed from recovered pixel block data. For example, the in-loop filter 950 may include a deblocking filter 952 and a sample adaptive offset ("SAO") filter 953. The deblocking filter 952 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. FIG. 9 does not illustrate an exhaustive set of filters that may be used for in-loop filtering; in other aspects, the in-loop filter 950 may perform adaptive loop filtering (ALF), maximum likelihood (ML) based filtering schemes, deringing, debanding, sharpening, resolution scaling, and the like. The selection of filters to be applied by the in-loop filter 950 may be determined by parameters that are selected by the controller 980.

The reference picture store 960 may store filtered frame data for use in later prediction of other pixel blocks. Different types of prediction data are made available to the predictor 970 for different prediction modes. For example, for an input pixel block, intra prediction takes a prediction reference from decoded data of the same picture in which the input pixel block is located. Thus, the reference picture store 960 may store decoded pixel block data of each picture as it is coded. For the same input pixel block, inter prediction may take a prediction reference from previously coded and decoded picture(s) that are designated as reference pictures. Thus, the reference picture store 960 may store these decoded reference pictures.

As discussed, the predictor 970 may supply prediction data to the pixel block coder 910 for use in generating residuals. The predictor 970 may include an inter predictor 972, an intra predictor 973 and a mode decision unit 974. The inter predictor 972 may receive pixel block data representing a new pixel block to be coded and may search reference picture data from store 960 for pixel block data from reference picture(s) for use in coding the input pixel block. The inter predictor 972 may support a plurality of prediction modes, such as P mode coding and B mode coding. The inter predictor 972 may select an inter prediction mode and an identification of candidate prediction reference data that provides a closest match to the input pixel block being coded. The inter predictor 972 may generate prediction reference metadata, such as motion vectors, to identify which portion(s) of which reference pictures were selected as source(s) of prediction for the input pixel block.

The intra predictor 973 may support Intra (I) mode coding. The intra predictor 973 may search from among pixel block data from the same picture as the pixel block being coded that provides a closest match to the input pixel block. The intra predictor 973 also may generate prediction reference indicators to identify which portion of the picture was selected as a source of prediction for the input pixel block.

The mode decision unit 974 may select a final coding mode to be applied to the input pixel block. Typically, as described above, the mode decision unit 974 selects the prediction mode that will achieve the lowest distortion when video is decoded given a target bitrate. Exceptions may arise when coding modes are selected to satisfy other policies to which the coding system 900 adheres, such as satisfying a particular channel behavior, or supporting random access or data refresh policies. When the mode decision selects the final coding mode, the mode decision unit 974 may output a selected reference block from the store 960 to the pixel block coder and decoder 910, 940 and may supply to the controller 980 an identification of the selected prediction mode along with the prediction reference indicators corresponding to the selected mode.

The controller 980 may control overall operation of the coding system 900. The controller 980 may select operational parameters for the pixel block coder 910 and the predictor 970 based on analyses of input pixel blocks and also external constraints, such as coding bitrate targets and other operational parameters. As is relevant to the present discussion, when it selects quantization parameters QP, the use of uniform or non-uniform quantization processors, and/or the transform mode M, it may provide those parameters to the syntax unit 990, which may include data representing those parameters in the data stream of coded video data output by the system 900. The controller 980 also may select between different modes of operation by which the system may generate reference images and may include metadata identifying the modes selected for each portion of coded data.

During operation, the controller 980 may revise operational parameters of the quantization processor 916 and the transform unit 915 at different granularities of image data, either on a per pixel block basis or on a larger granularity (for example, per picture, per slice, per largest coding unit ("LCU") or another region). In an aspect, the quantization parameters may be revised on a per-pixel basis within a coded picture.

Additionally, as discussed, the controller 980 may control operation of the in-loop filter 950 and the prediction unit 970. Such control may include, for the prediction unit 970, mode selection (lambda, modes to be tested, search windows, distortion strategies, etc.), and, for the in loop filter 950, selection of filter parameters, reordering parameters, weighted prediction, etc.

FIG. 10 is a functional block diagram of a decoding system 1000 according to an aspect of the present disclosure. The decoding system 1000 may include a syntax unit 1010, an entropy decoder 1020, an inverse slice scan system 1030, a pixel block decoder 1040, an in-loop filter 1050, a reference picture store 1060, a predictor 1070, a controller 1080 and a predictor 1070. The syntax unit 1010 may receive a coded video data stream and may parse the coded data into its constituent parts. Data representing coding parameters may be furnished to the controller 1080 while the entropy-coded data may be output to the entropy decoder 1020. The entropy decoder 1020 may apply entropy decoding, which generates recovered coefficients therefrom. The inverse slice scan system 1030 may reorganize the recovered coefficients as pixel blocks, which may be input to the pixel block decoder 1040. The pixel block decoder 1040 may invert coding operations provided by the pixel block coder 910 (FIG. 9), generating recovered pixel data therefrom. The in-loop filter 1050 may filter frames that are assembled from the recovered pixel block data. The filtered frames may be output from the decoding system 1000 as recovered frame data.

Recovered pictures also may be stored in the prediction buffer 1060 for use in prediction operations. The predictor 1070 may supply prediction data to the pixel block decoder 1040 as determined by coding data received in the coded video data stream.

The pixel block decoder 1040 may include an inverse quantization processor 1042, an inverse transform processor 1044, and an adder 1046. The inverse quantization processor 1042 may invert operations of the quantization processor 916 of the pixel block coder 910 (FIG. 9). Similarly, the inverse transform processor 1044 may invert operations of the transform processor 914 (FIG. 9). They may use the quantization parameters QP and transform modes M that are provided in the coded video data stream. Because quantization is likely to truncate data, the data recovered by the inverse quantization processor 1042, likely will possess coding errors when compared to the input data presented to its counterpart quantization processor 916 in the pixel block coder 910 (FIG. 9).

The adder 1046 may invert operations performed by the subtractor 912 of the pixel block coder 910 (FIG. 9). It may receive a prediction pixel block from the predictor 1070 as determined by prediction references in the coded video data stream. The adder 1046 may add the prediction pixel block to reconstructed residual values output by the inverse transform processor 1044 and may output reconstructed pixel block data.

The in-loop filter 1050 may perform various filtering operations on reconstructed pixel block data. As illustrated, the in-loop filter 1050 may include a deblocking filter 1052 and an SAO filter 1054. The deblocking filter 1052 may filter data at seams between reconstructed pixel blocks to reduce discontinuities between the pixel blocks that arise due to coding. SAO filters 1054 may add offset to pixel values according to an SAO type, for example, based on edge direction/shape and/or pixel level. Other types of in-loop filters may also be used in a similar manner. Operation of the deblocking filter 1052 and the SAO filter 1054 ideally would mimic operation of their counterparts in the coding system 900 (FIG. 9). Thus, in the absence of transmission errors or other abnormalities, the decoded picture obtained from the in-loop filter 1050 of the decoding system 1000 would be the same as the decoded picture obtained from the in-loop filter 950 of the coding system 900 (FIG. 9); in this manner, the coding system 900 and the decoding system 1000 should store a common set of reference pictures in their respective reference picture stores 940, 1060.

As with FIG. 9, FIG. 10 does not illustrate an exhaustive set of filters that may be used for in-loop filtering; in other aspects, the in-loop filter 1050 may perform adaptive loop filtering (ALF), maximum likelihood (ML) based filtering schemes, deringing, debanding, sharpening, resolution scaling, and the like. The selection of filters to be applied by the in-loop filter 1050 may be determined by parameters that are provided in the coded video data.

The reference picture store 1060 may store filtered pixel data for use in later prediction of other pixel blocks. The reference picture store 1060 may store decoded pixel block data of each picture as it is coded for use in intra prediction. The reference picture store 1060 also may store decoded reference pictures.

As discussed, the predictor 1070 may supply the transformed reference block data to the pixel block decoder 1040.

The predictor 1070 may supply predicted pixel block data as determined by the prediction reference indicators supplied in the coded video data stream.

The controller 1080 may control overall operation of the coding system 1000. The controller 1080 may set operational parameters for the pixel block decoder 1040 and the predictor 1070 based on parameters received in the coded video data stream. As is relevant to the present discussion, these operational parameters may include quantization parameters QP for the inverse quantization processor 1042 and transform modes M for the inverse transform unit 1010. As discussed, the received parameters may be set at various granularities of image data, for example, on a per pixel block basis, a per picture basis, a per slice basis, a per LCU basis, or based on other types of regions defined for the input image.

Although the foregoing description has described the entropy coding techniques proposed herein operating within the context of a video coding system, the principles of the present disclosure are not so limited. Entropy coding processes typically are applied to many kinds of data, including still image data (e.g., JPEG) and audio data. Indeed, the principles of the present disclosure find application to code any kind of data set that is populated by zero-valued data items and nonzero valued data items for serial transmission and reduce transmission bandwidth of such data items.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A coding method, comprising:
   transforming pixel blocks representing content of a source image into respective blocks of transform coefficients;

quantizing the transform coefficients of each pixel block;
entropy coding the quantized coefficients of the pixel blocks by, iteratively:
 a. transmitting data identifying a number of consecutive nonzero values encountered along a scan direction among the pixel blocks followed by values of the consecutive nonzero values so identified, and
 b. transmitting data identifying a number of consecutive zero values encountered along the scan direction.

2. The method of claim 1, wherein step a precedes step b in a first iteration.

3. The method of claim 1, further comprising an entropy decoding method, comprising, iteratively:
 in a first portion of the method:
  extracting, from the transmitted data, an identifier of a number of consecutive nonzero values,
  extracting a value of each of the identified number of nonzero values, and
  placing the extracted nonzero values in an output data sequence; and
 in a second portion of the method:
  extracting, from the transmitted data, an identifier of a number of consecutive zero values,
  placing a zero value for each of the identified number of consecutive zero values in the output data sequence.

4. The method of claim 1, wherein step b precedes step a in a first iteration.

5. The method of claim 1, wherein, when there are additional nonzero values to transmit, the method advances from step b of a first iteration directly to step a of a second iteration.

6. The method of claim 1, wherein, when there are additional nonzero values to transmit, the method comprises:
 transmitting a next nonzero value encountered along the scan direction, and advancing to step a for a second iteration of the method.

7. The method of claim 1, wherein the method terminates when an end of values encountered along the scan direction is reached.

8. The method of claim 1, wherein the method terminates when a position along the scan direction is reached from which all remaining values are zero.

9. The method of claim 1, wherein the scan direction among pixel blocks is a predetermined scan order.

10. The method of claim 1, wherein the scan direction among pixel blocks proceeds across like-kind transform coefficients of the pixel blocks together, before proceeding to other transform coefficients.

11. The method of claim 3, further comprising:
 organizing the output data sequence into coded video data representing the pixel blocks, and
 decoding the coded video data of each pixel block.

12. The method of claim 3, wherein the first portion precedes the second portion in a first iteration of the method.

13. The method of claim 3, wherein the second portion precedes the first portion in a first iteration of the method.

14. The method of claim 3, wherein, following a first iteration of the method, when there are additional nonzero values present in the transmitted data, the method advances from second portion of a first iteration of the method directly to the first portion of a second iteration of the method.

15. The method of claim 3, wherein, following a first iteration of the method, when there are additional nonzero values present in the transmitted data, the method comprises:
 extracting, from the transmitted data, a next nonzero value,
 placing the next nonzero value in the output data sequence, and
 advancing to a first portion of another iteration of the method.

16. The method of claim 3, wherein the method terminates when an end of the transmitted data is reached.

17. The method of claim 3, wherein the method terminates when a position in the transmitted data is reached from which all remaining values are zero.

18. A coder, comprising:
 a transformer, having an input for pixel blocks representing content of a source image and an output for respective blocks of transform coefficients;
 a quantizer, having an input for the blocks of transform coefficients and an output for respective quantized coefficients of the blocks of transform coefficients;
 an entropy coder, having an input for the quantized coefficients, that alternates between nonzero value coding and zero value coding of values of the quantized coefficients encountered along a scan direction among the pixel blocks, in which:
  during the nonzero value coding, the entropy coder outputs a first data item identifying a number of consecutive nonzero values followed by a data item for each of the nonzero values so identified, and
  during the zero value coding, the entropy coder outputs another data item identifying a number of consecutive zero values.

19. The coder of claim 18, further comprising:
 a slice scan system having an input for the quantized coefficients and an output for the values of the quantized coefficients, assembled according to the scan direction among the pixel blocks.

20. The coder of claim 19, further comprising:
 a pixel block encoder, comprising the transformer and the quantizer, wherein the pixel block encoder has an input for prediction data for the respective pixel blocks.

21. The coder of claim 19, further comprising a video decoder, comprising:
 an entropy decoder having an input for the entropy coder output, the entropy decoder alternating between decoding of nonzero values and zero values in which:
  during the nonzero value decoding and, responsive to the first data item in the entropy coder output identifying a number of consecutive nonzero values, the entropy decoder extracts a nonzero value of each of the identified number of consecutive nonzero values from the entropy coder output and places the extracted nonzero values into output data; and
  during the zero value decoding and, responsive to the another data item in the entropy coder output identifying a number of consecutive zero values, the entropy decoder
 places a zero value for each of the identified number of consecutive zero values into the output data;
 a slice scan system having an input for the output data and an output for pixel block data arrays representing the output data; and
 a pixel block decoder, having an input for the pixel block data arrays and an output for reconstructed pixel block data.

22. The video decoder of claim 21, wherein the pixel block decoder has an input for prediction data for the respective pixel blocks.

23. The coder of claim 21, further comprising, after the placing the identified number of consecutive zero values into the output data, the entropy decoder extracts another nonzero value from the entropy coder output and places it in the output data.

24. A non-transitory computer readable medium having stored thereon coded video data generated according to a coding method, comprising:
transforming pixel blocks representing content of a source image into respective blocks of transform coefficients;
quantizing the transform coefficients of each pixel block;
entropy coding the quantized coefficients of the pixel blocks by, iteratively:
transmitting a data item identifying a number of consecutive nonzero values encountered along a scan direction among the pixel blocks followed by other data items each representing a value of each of the identified number of consecutive nonzero values, and
transmitting a data item identifying a number of consecutive zero values encountered along the scan direction.

25. The medium of claim 24, further comprising, after transmitting the data item identifying a number of consecutive zero values, transmitting another data item representing a next nonzero value in the array.

26. A coding method consisting essentially of:
transforming pixel blocks representing content of a source image into respective blocks of transform coefficients;
quantizing the transform coefficients of each pixel block;
entropy coding the quantized coefficients of the pixel blocks by,
iteratively:
a. transmitting data identifying a number of consecutive nonzero values encountered along a scan direction among the pixel blocks followed by a value of for each of the identified number of consecutive nonzero values, and
b. transmitting data identifying a number of consecutive zero values encountered along the scan direction.

27. The method of claim 26, wherein the pixel blocks comprise respective luma component blocks.

* * * * *